United States Patent
Harada et al.

(10) Patent No.: US 10,432,365 B2
(45) Date of Patent: Oct. 1, 2019

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Kazuaki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 15/549,395

(22) PCT Filed: Feb. 19, 2016

(86) PCT No.: PCT/JP2016/054782
§ 371 (c)(1),
(2) Date: Aug. 8, 2017

(87) PCT Pub. No.: WO2016/133181
PCT Pub. Date: Aug. 25, 2016

(65) Prior Publication Data
US 2018/0027568 A1    Jan. 25, 2018

(30) Foreign Application Priority Data

Feb. 19, 2015    (JP) ................. 2015-030784

(51) Int. Cl.
*H04L 5/00* (2006.01)
*H04W 72/04* (2009.01)
(Continued)

(52) U.S. Cl.
CPC .............. *H04L 5/001* (2013.01); *H04J 11/00* (2013.01); *H04L 5/0048* (2013.01);
(Continued)

(58) Field of Classification Search
None
See application file for complete search history.

(56) References Cited

U.S. PATENT DOCUMENTS 9,681,325 B2 * 6/2017 Chen .................. H04L 1/0026
2013/0194981 A1   8/2013 Wang et al.
(Continued)

OTHER PUBLICATIONS

NEC, "Initial considerations on carrier aggregation up to 32 carriers", 3GPP TSG RAN WG1 Meeting #80, Athens Greece, Feb. 9-13, 2015, R1-150292 (Year: 2015).*
(Continued)

Primary Examiner — Joseph A Bednash
(74) Attorney, Agent, or Firm — Osha Liang LLP

(57) ABSTRACT

The present invention is designed reduce the increase of load in user terminals even when the number of CCs that can be configured in a user terminal is expanded from that of existing systems and/or when CA is executed using unlicensed CCs. A user terminal communicates with a radio base station by means of carrier aggregation using a plurality of component carriers (CCs), and has a receiving section that receives DL signals transmitted from each CC, a measurement section that makes measurements by using the DL signals, and a control section that controls the receiving operations in the receiving section and the measurement operations in the measurement section, and, when a plurality of CCs, including at least a first CC, which corresponds to a primary CC of an existing system, and a third CC, which is different from the first CC and a second CC that corresponds to a secondary CC of the existing system, are configured, the control section applies, to the third CC, receiving operations and/or measurement operations that are different from those of the second CC.

7 Claims, 13 Drawing Sheets

(51) Int. Cl.
*H04J 11/00* (2006.01)
*H04W 24/10* (2009.01)
*H04W 72/08* (2009.01)
*H04W 16/14* (2009.01)
*H04L 5/14* (2006.01)
*H04W 74/08* (2009.01)

(52) U.S. Cl.
CPC .......... *H04L 5/0053* (2013.01); *H04W 16/14* (2013.01); *H04W 24/10* (2013.01); *H04W 72/0486* (2013.01); *H04W 72/082* (2013.01); *H04L 5/14* (2013.01); *H04W 74/0808* (2013.01)

(56) References Cited

U.S. PATENT DOCUMENTS

2014/0098774 A1    4/2014   Gao et al.
2014/0328228 A1*  11/2014   Park et al. .......... H04W 72/042
                                                         370/280

OTHER PUBLICATIONS

Ericsson et al., "Study on Licensed-Assisted Access using LTE", 3GPP TSG RAN Meeting #65, Edinburgh, Scotland, Sep. 9-12, 2014, RP-141646 (Year: 2014).*
ITL Inc., "The on/off state indication of SCell in LAA unlicensed carrier for DL measurement" 3GPP TSG RAN WG1 Meeting #79, San Francisco, USA, Nov. 17-21, 2014, R1-145110 (Year: 2014).*
ZTE, "Considerations on Measurements for LAA", 3GPP TSG-RAN WG1 Meeting #79, San Francisco, USA, Nov. 17-21, 2014, R1-144827 (Year: 2014).*
ETRI, Discussion on HARQ operation for LAA. 3GPP TSG-RAN WG1 Meeting #80, Athens, Greece, Feb. 9-13, 2015, R1-150633 (Year: 2015).*
Hitachi Ltd. "Design targets for LAA using LTE", 3GPP TSG-RAN WG1 Meeting #78bis, Ljubljana. Slovenia, Oct. 6-10, 2014, R1-144221 (Year: 2014).*
HTC, "Measurement and Synchronization for LAA-LTE", 3GPP TSG RAN WG1 Meeting #79, San Francisco, USA, Nov. 17-21, 2014, R1-144928 (Year: 2014).*
Nokia Networks et al., "Short Control Signalling for LTE LAA", 3GPP TSG RAN WG1 Meeting #78bis, Ljubljana, Slovenia, Oct. 6-10, 2014, R1-144186 (Year: 2014).*
International Search Report issued in corresponding application No. PCT/JP2016/054782 dated Apr. 12, 2016 (4 pages).
Written Opinion of the International Searching Authority issued in corresponding application No. PCT/JP2016/054782 dated Apr. 12, 2016 (3 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Extended European Search Report issued in corresponding European Patent Application No. 16752567.4, dated Aug. 16, 2018 (10 pages).
CATT, "Enhancements to support carrier aggregation with up to 32 component carriers", 3GPP TSG RAN WG1 Meeting #80, R1-150103, Athens, Greece, Feb. 9-13, 2015 (3 pages).
ETRI, "Discussion on HARQ operation for LAA", 3GPP TSG RAN WG1 Meeting #80, R1-150633, Athens, Greece, Feb. 9-13, 2015 (12 pages).

* cited by examiner

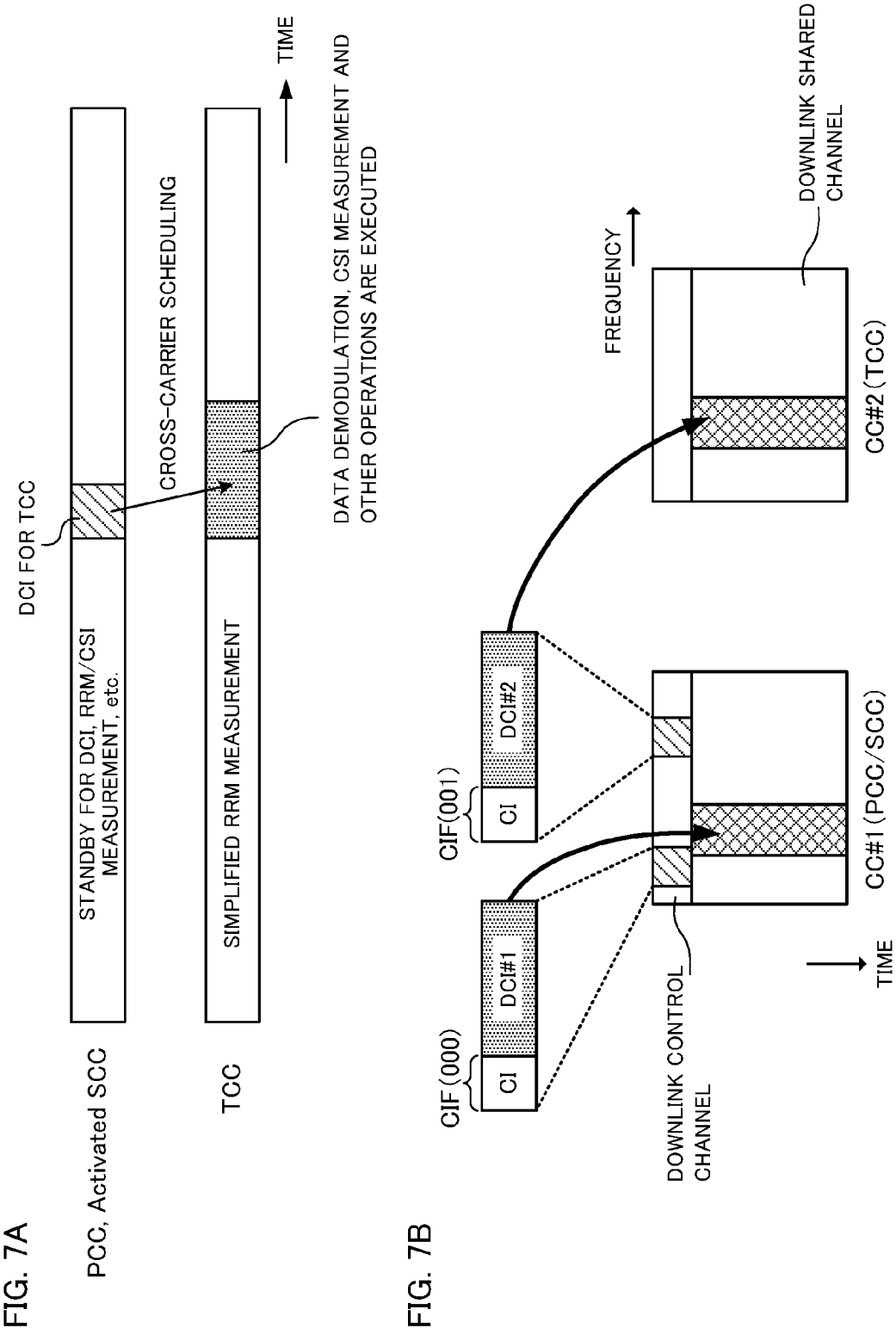

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Successor system of LTE—referred to as "LTE-advanced" (also referred to as "LTE-A")—have been under study for the purpose of achieving further broadbandization and increased speed beyond LTE, and the specifications thereof have been drafted as LTE Rel. 10 to 12.

The system band in LTE Rel. 10 to 12 includes at least one component carrier (CC), where the LTE system band constitutes one unit. Such bundling of a plurality of CCs into a wide band is referred to as "carrier aggregation" (CA). Also, in LTE Rel. 12 supports dual connectivity (DC), in which a user terminal communicates by using CCs that are controlled separately by different radio base stations (schedulers).

In CA/DC in the above-mentioned successor systems of LTE (LTE Rel. 10 to 12), the maximum number of CCs that can be configured per user terminal (UE) is limited to five. With LTE of Rel. 13 and later versions, which are more advanced successor systems of LTE, studies are in progress to mitigate the limit of the number of CCs that can be configured in a user terminal and to configure six or more CCs (for example, 32 CCs), in order to makes possible more flexible and faster communication.

The specifications of LTE Rel. 8 to 12 have been drafted assuming exclusive operations in frequency bands that are licensed to operators—that is, licensed bands. As licensed bands, for example, 800 MHz, 2 GHz and/or 1.7 GHz are used.

Furthermore, for future radio communication systems (Rel. 13 and later versions), a system ("LTE-U" (LTE Unlicensed)) to run LTE systems not only in frequency bands licensed to communications providers (operators) (licensed bands), but also in frequency bands where license is not required (unlicensed bands), is under study. In particular, a system (LAA: Licensed-Assisted Access) to run an unlicensed band assuming the presence of a licensed band is also under study. Note that systems that run LTE/LTE-A in unlicensed bands may be collectively referred to as "LAA." A licensed band is a band in which a specific provider is allowed exclusive use, and an unlicensed band is a band which is not limited to a specific provider, and in which radio stations can be provided.

An unlicensed band may be run without even synchronization, coordination and/or cooperation between different operators and/or non-operators, and there is a threat that significant cross-interference is produced in comparison to a licensed band. Consequently, when an LTE/LTE-A system (LTE-U) is run in an unlicensed band, it is desirable if the LTE/LTE-A system operates by taking into account the cross-interference with other systems that run in unlicensed bands such as Wi-Fi, other operators' LTE-U, and so on. In order to prevent cross-interference in unlicensed bands, a study is in progress to allow an LTE-U base station/user terminal to perform "listening" before transmitting a signal and limit the transmission depending on the result of listening.

Also, for unlicensed bands, for example, the 2.4 GHz band and the 5 GHz band where Wi-Fi (registered trademark) and Bluetooth (registered trademark) can be used, and the 60 GHz band where millimeter-wave radars can be used are under study for use. Studies are in progress to use these unlicensed bands in small cells.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

CA/DC for use in systems according to LTE Rel. 10 to 12 supports one primary cell ("PCell," "PCC," etc.) and maximum four secondary cells ("SCells," "SCCs," etc.) as cells (CCs) to configure in a user terminal. In this way, in CA for existing systems (LTE Rel. 10 to 12), the number of CCs that can be configured per user terminal (UE) is limited to maximum five.

Meanwhile, when the number of CCs that can be configured in a user terminal is expanded to six or above (for example, 32 CCs) in more advanced successor systems of LTE (for example, LTE Rel. 13 and later versions), the load of the user terminal might grow following the increase of the number of CCs. For example, when additional CCs ("expanded CCs") are configured in a user terminal as SCCs, the load that is required of the user terminal for the measurement (RRM measurements, CSI measurements, etc.) operations for each SCC, the DL signal receiving operations, and so on is likely to grow.

Also, when an unlicensed CC is configured in a user terminal as an SCC (for example, an as an expanded CC), cases might occur where, depending on the result of listening (the result of LBT), the user terminal is unable to transmit and receive signals with the unlicensed CC on a regular basis. Consequently, if the user terminal tries to perform the measurement operations, receiving operations and so on for the unlicensed CC as for SCCs (SCells) of existing systems, unnecessary operations might increase, and there is a threat of increasing the user terminal's load.

The present invention has been made in view of the above, and it is therefore an object of the present invention to provide a user terminal, a radio base station and a radio communication method that can reduce the increase of load on user terminals even when the number of CCs that can be configured in a user terminal is expanded from that of existing systems and/or when CA is executed using unlicensed CCs.

Solution to Problem

One aspect of the present invention provides a user terminal that communicates with a radio base station by means of carrier aggregation using a plurality of component carriers (CCs), and this user terminal has a receiving section that receives DL signals transmitted from each CC, a measurement section that makes measurements by using the DL signals, and a control section that controls the receiving operations in the receiving section and the measurement operations in the measurement section, and, in this user terminal, when a plurality of CCs, including at least a first CC, which corresponds to a primary CC of an existing system, and a third CC, which is different from the first CC and a second CC that corresponds to a secondary CC of the existing system, are configured, the control section applies, to the third CC, receiving operations and/or measurement operations that are different from those of the second CC.

Advantageous Effects of Invention

According to the present invention, the increase of load on user terminals can be reduced even when the number of CCs that can be configured in a user terminal is expanded from that of existing systems and/or when CA is executed using unlicensed CCs.

BRIEF DESCRIPTION OF DRAWINGS

FIG. 7 provide diagrams to show examples of receiving operations/measurement operations for a TCC;

DESCRIPTION OF EMBODIMENTS

Figure 1:
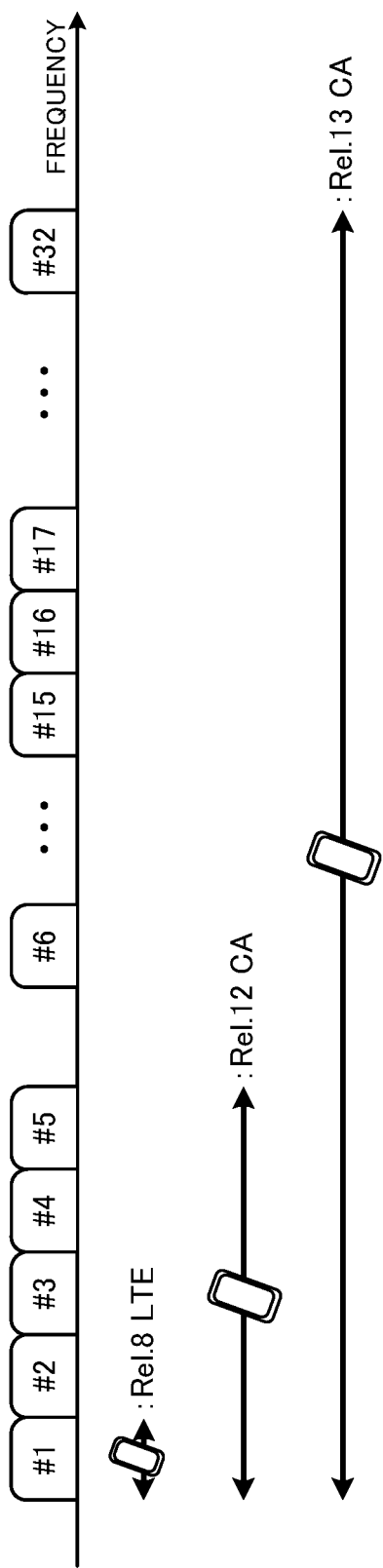
FIG. 1 is a diagram to explain an overview of carrier aggregation in successor systems of LTE.

FIG. 1 is a diagram to explain carrier aggregation (CA). As shown in FIG. 1, in CA of existing systems (up to LTE Rel. 12), maximum five component carriers (CCs) (CC #1 to CC #5), where the system band of LTE Rel. 8 constitutes one unit, are bundled. That is, in carrier aggregation up to LTE Rel. 12, the number of CCs that can be configured in a user terminal (UE: User Equipment) is limited to maximum five (one primary cell and maximum four secondary cells).

The primary cell (PCell, PCC, etc.) refers to the cell that manages RRC connection, handover and so on when CA/DC is used, and is also a cell that requires UL communication in order to receive data and feedback signals from terminals. The primary cell is always configured in both the uplink and the downlink. A secondary cell (SCell, SCC, etc.) refers to another cell that is configured apart from the primary cell when CA/DC is used. A secondary cell may be configured in the downlink alone, or may be configured in both the uplink and the downlink at the same time.

Meanwhile, in more advanced successor systems of LTE (for example, LTE Rel. 13 and later versions), a study is in progress to soften the limit of the number of CCs that can be configured per user terminal, and use enhanced carrier aggregation (CA enhancement), in which six or more CCs (cells) are configured. For example, as shown in FIG. 1, when 32 CCs (CC #1 to CC #32) are bundled, a bandwidth of maximum 640 MHz can be secured. In this way, more flexible and faster radio communication is expected to be made possible by increasing the number of CCs that can be configured in a user terminal.

Furthermore, for more advanced successor systems of LTE (for example, Rel. 13 and later versions), systems to run LTE systems not only in frequency bands licensed to communications providers (operators) (licensed bands), but also in frequency bands where license is not required (unlicensed bands), are under study.

The premise of existing LTE/LTE-A is that it is run in licensed bands, and therefore each operator is allocated a different frequency band. However, unlike a licensed band, an unlicensed band is not limited to use by a specific provider. When run in an unlicensed band, LTE may be carried out without even synchronization, coordination and/or cooperation between different operators and/or non-operators. In this case, a plurality of operators and/or systems share and use the same frequency in the unlicensed band, and therefore there is a threat of producing cross-interference.

Figure 2:
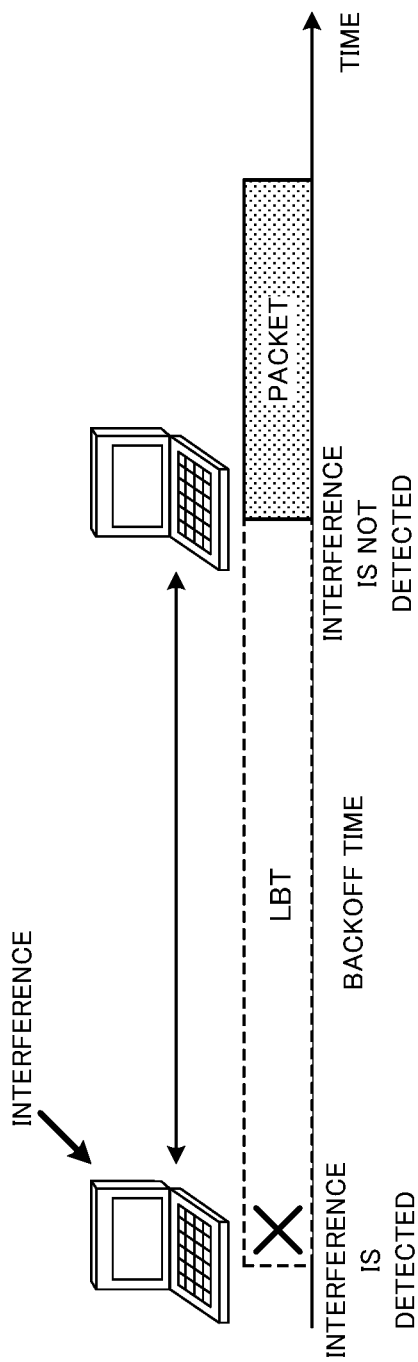
FIG. 2 is a diagram to show an example of transmission control for use when listening (LBT) is used.

In Wi-Fi systems that are run in unlicensed bands, carrier sense multiple access/collision avoidance (CSMA/CA), which is based on the mechanism of LBT (Listen Before Talk), is employed. To be more specific, for example, a method, whereby each transmission point (TP), access point (AP), Wi-Fi terminal (STA: Station) and so on perform "listening" (CCA: Clear Channel Assessment) before carrying out transmission, and carries out transmission only when there is no signal beyond a predetermined level, is used. When there is a signal to exceed a predetermined level, a waiting time (backoff time) is provided, which is determined on a random basis, and, following this, listening is performed again (see FIG. 2).

So, for LTE/LTE-A systems that are run in unlicensed bands (for example, LAA), too, a study is in progress to use transmission control based on the result of listening. For example, a radio base station and/or a user terminal perform listening (LBT) before transmitting signals in an unlicensed band cell, and checks whether other systems (for example, Wi-Fi) and/or other operators are communicating. If, as a result of listening, the received signal intensity from other systems and/or other LAA transmission points is equal to or lower than a predetermined value, the radio base station and/or the user terminal judge that the channel is in the idle state (LBT_idle) and transmit signals. On the other hand, if, as a result of listening, the received signal intensity from other systems and/or other LAA transmission points is greater than the predetermined value, the radio base station and/or the user terminal judge that the channel is in the busy state (LBT_busy), and limit signal transmission.

Note that "listening" herein refers to the operation which radio base stations and/or user terminals perform before transmitting signals in order to check/measure whether or not signals to exceed a predetermined level (for example, predetermined power) are being transmitted from other transmission points. Also, this "listening" performed by radio base stations and/or user terminals may be referred to as "LBT" (Listen Before Talk), "CCA" (Clear Channel Assessment), and so on. As to how to limit signal transmission based on the result of LBT, possible methods include making a transition to another carrier by way of DFS (Dynamic Frequency Selection), applying transmission power control (TPC), holding (stopping) signal transmission, and so on.

In this way, by using LBT in communication in LTE/LTE-A (for example, LAA) systems that are run in unlicensed bands, it becomes possible to reduce the interference with other systems and so on.

Now, as shown in FIG. 1, expanding the number of CCs is effective to widen the band in carrier aggregation (LAA: License-Assisted Access) between licensed bands and unlicensed bands. For example, five licensed band CCs (=100 MHz) and fifteen unlicensed band CCs (=300 MHz) are bundled, and a bandwidth of 400 MHz can be secured.

Figure 3:
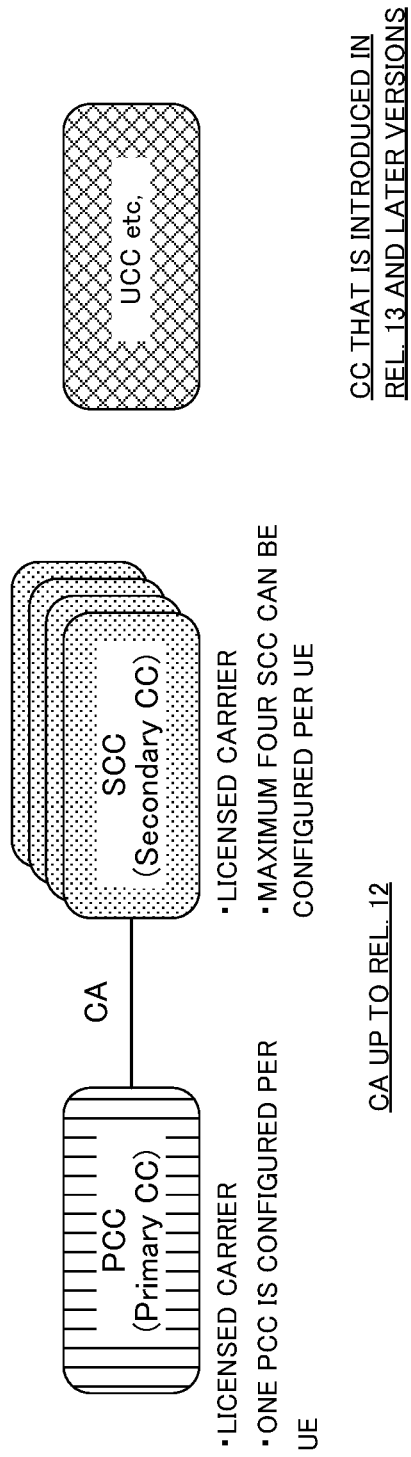
FIG. 3 is a diagram to explain CA using a PCC and SCCs of an existing system, and an unlicensed CC.

Meanwhile, when the number of CCs that can be configured in a user terminal is expanded, and/or when CA is executed using an unlicensed CC (UCC), how to configure the expanded CCs and/or the unlicensed CC (UCC) and how to control the user terminal's operations is the problem (see FIG. 3).

Figure 4:
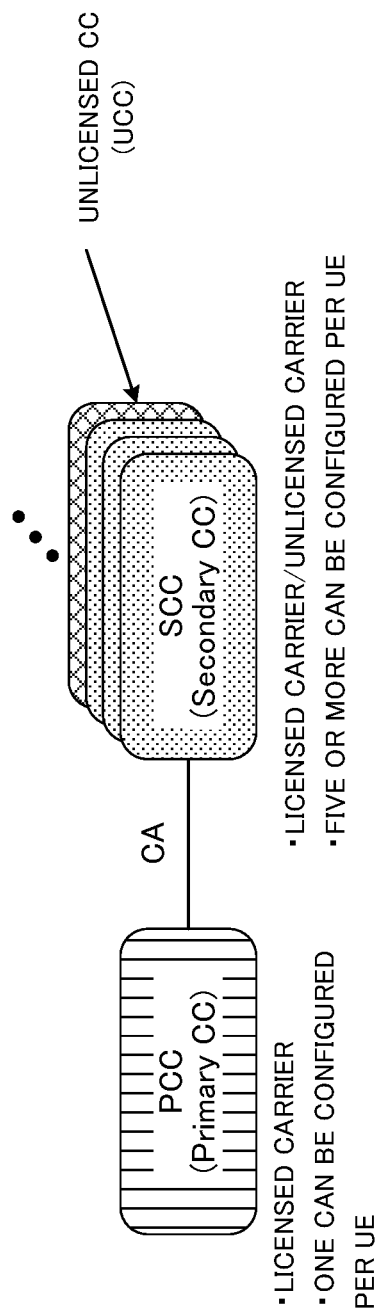
FIG. 4 is a diagram to show an example of a case where unlicensed CCs are configured as SCCs.

For example, as shown in FIG. 4, it may be possible to execute CA, assuming that an unlicensed CC (UCC: Unlicensed Component Carrier) is a secondary cell (SCC) of an existing system. Note that the unlicensed CC (UCC) in FIG. 4 may be configured as an expanded CC as well.

However, the transmission/non-transmission (ON/OFF) state in an unlicensed CC changes dynamically, because pre-transmission LBT is the premise of unlicensed carriers. Consequently, there is a threat that user terminals are unable to transmit signals on a regular basis as in the PCC or in SCCs in the activated state. On the other hand, in UCCs, although signals are not transmitted on a regular basis, signals start being transmitted or received soon depending on the result of LBT, so that it is necessary to control user terminals to be able to transmit and receive these signals. In this way, the present inventors have focused on the fact the user terminal operations that are required by UCCs are different from those required by existing activated state or non-SCCs in the activated state.

Also, unlicensed bands generally have a wide band, and may be used as expanded CCs according to Rel. 13 and later versions. In this case, as shown in FIG. 4, controlling expanded CCs (for example, UCCs) in the same way as existing SCCs might result in increasing the load on the user terminal end. For example, in order to quickly start communicating in multiple CCs, a user terminal may configure a plurality of SCCs first, and, after executing measurement operations (for example, RRM measurements) for the SCCs in the deactivated state, activate an SCC of good quality, and start communicating. However, if many CCs that are configured in a user terminal are subjected to measurements as in measurements for existing PCCs and SCCs, the load upon user terminals increases in proportion to the number of CCs configured.

Also, since an unlicensed carrier allows co-presence with other systems, the quality varies significantly compared to a licensed carrier, and the reliability of communication is highly likely to deteriorate. Consequently, in LAA, it may be possible to support communication in an unlicensed carrier by using a licensed carrier (for example, report LBT results by using the licensed carrier). In this case, the user terminal operations required by unlicensed CCs may be different from those required by existing SCCs.

So, the present inventors have come up with the idea of applying operation/control to user terminals differently between expanded CCs and unlicensed CCs, and existing PCCs and SCCs. Also, the present inventors have come up with the idea of configuring a new CC that is neither a PCC nor an SCC, and configuring/reporting this CC to a user terminal, so as to enable the user terminal to distinguish the CC (for example, a UCC), to which different operations/control are applied, from the PCCs and SCCs of existing systems (Rel. 10 to 12).

Figure 5:
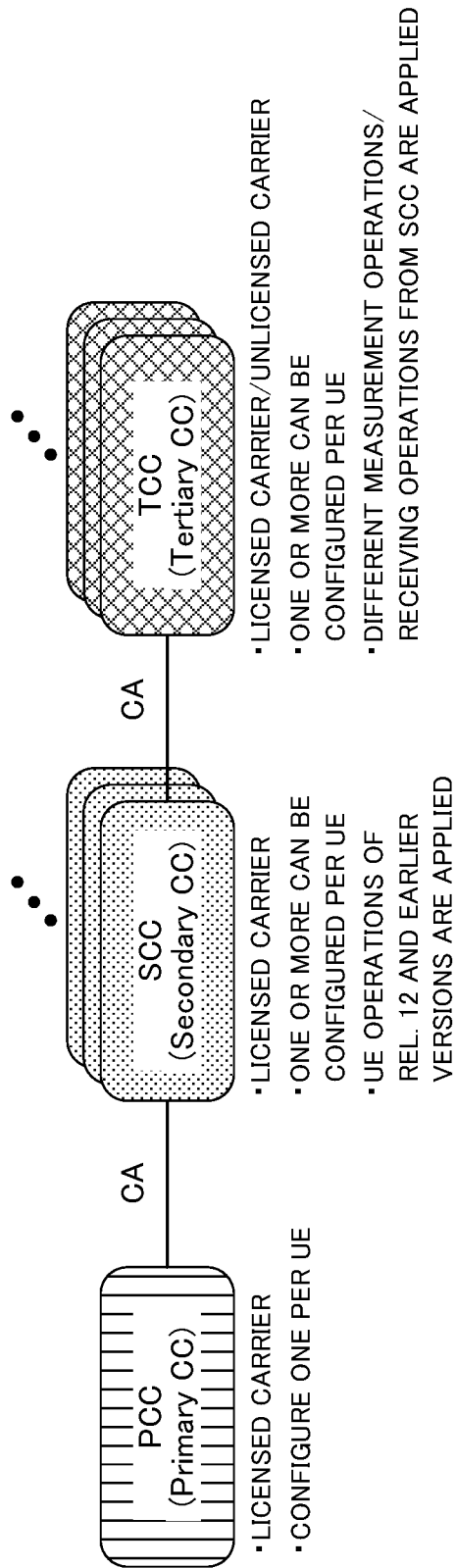
FIG. 5 is a diagram to show an example of carrier aggregation in which TCCs are used.

To be more specific, the present inventors have come up with the idea of defining expanded CCs and/or UCCs differently from existing PCCs and SCCs, and applying different control/operations from those of existing SCCs (see FIG. 5). In this description, a CC, to which different control/operations from those of PCCs and SCCs of existing systems (Rel. 10 to Rel. 12) are applied, will be referred to as a "TCC" (Tertiary CC), a "TCell," a "third CC" or a "third cell" (hereinafter "TCC"). A TCC can be constituted by a licensed CC and/or an unlicensed CC.

A user terminal, in which a TCC is configured, can apply different control/operations (for example, measurement operations, receiving operations, etc.) to the TCC, from those for SCCs (see FIG. 5). For example, the user terminal can perform different receiving operations (including, for example, downlink control information (DCI) and/or reference signal receiving processes) with respect to the TCC, from those for PCCs and SCCs. Also, the user terminal can apply different measurement operations (measurement method, measurement conditions (requirements, etc.) to the TCC, from those of PCCs and SCCs.

By this means, even when many CCs are configured in a user terminal, it is still possible to reduce the increase of load in user terminals by applying simple control and/or measurement operations to the TCCs. Also, when an unlicensed CC is configured in a user terminal as a TCC, by applying UL transmission operations that take LBT into account (and that are therefore different from those applied to PCCs and SCCs) to the TCC, it becomes possible to reduce wrong operations that arise from LBT results, and allow adequate communication.

Now, the present embodiment will be described below in detail. Note that, although cases will be described in the following description where one or more licensed CC and/or unlicensed CCs are configured as TCCs, this is by no means limiting. For example, TCCs can be constituted by unlicensed CCs alone. Also, with the present embodiment, it is equally possible to configure a PCC (PCell) and a TCC (TCell) in a user terminal and execute CA/DC (that is, SCCs (SCells) are not configured). Also, it is possible to configure five or more CCs in a user terminal as SCCs (SCells). Also, UL LBT and/or DL LBT can be used not only in unlicensed band, but also in licensed bands as well.

First Example

A case will be described with a first example where the measurement operations and receiving operations which a user terminal applies to a TCC (TCell) are different from those for PCCs (PCells) and SCCs (SCells) of existing systems. Also, examples of measurement operations/receiving operations for a TCC will be described below, assuming the case in which a TCC is in the activated state (activated TCC), the case in which a TCC is in the deactivated state (deactivated TCC), and the case in which a TCC is not configured in the activated state/deactivated state.

<Deactivated State>

When a TCC is configured in a user terminal but is in the deactivated state (deactivated), a user terminal can measure the TCC (deactivated TCC) based on different conditions (requirements) from those used in PCC and/or SCC measurements.

In an existing system, a user terminal makes measurements for an SCC in the deactivated state (for example, RRM (Radio Resource Measurement) measurements), and reports the measurement results to a radio base station. Based on the measurement results reported from the user terminal and so on, the radio base station controls the SCC's configuration state (the activated state or the deactivated state) and so on.

According to the present embodiment, a user terminal makes measurements with respect to TCCs in the deactivated state in the same way as with SCCs, but it is also possible to make the measurement conditions for TCCs softer than the conditions for SCCs. For example, a user terminal can make the measurement conditions (the measurement period, the measurement cycle, etc.) for TCCs softer than those of PCCs and/or SCCs, and execute measurements accordingly.

Figure 6A:
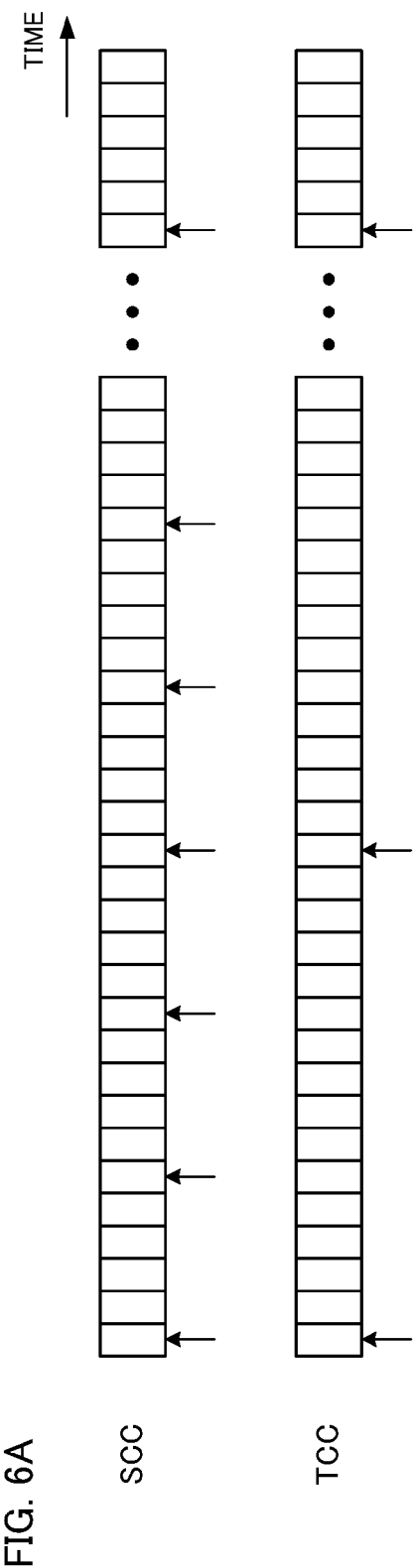
FIG. 6 provide diagrams to show an example of measurement operations for a TCC.

For example, a user terminal can configure a longer measurement cycle and/or a shorter measurement period in a TCC than in an SCC, and make measurements for the TCC (see FIG. 6A). In FIG. 6A, a case is shown in which a user terminal makes measurements for an SCC in a regular cycle (for example, every 40 ms), but makes measurements for a TCC in a longer cycle.

By this means, it is possible to simplify the measurement operations for the TCC, and reduce the user terminal's load. Note that the measurement cycles of the SCC and the TCC are not limited to the configurations shown in FIG. 6A, and can be configured as appropriate. Also, information about the TCC's measurement cycle and so on may be set forth in the specification in advance, or may be reported from the radio base station to the user terminal by using a predetermined CC (for example, the PCC and/or an SCC). Also, the user terminal may be structured to measure the TCC by applying the same conditions as those of the SCC, and configure the cycle of reporting the TCC's measurement results (transmission cycle) long.

Also, the user terminal can measure the TCC by softening the CC (cell) level to be detected and/or the reliability of measurements. The cell level to be detected is also referred to as a "side condition," and, for example, the lower-limit SINR value is this.

Figure 6B:
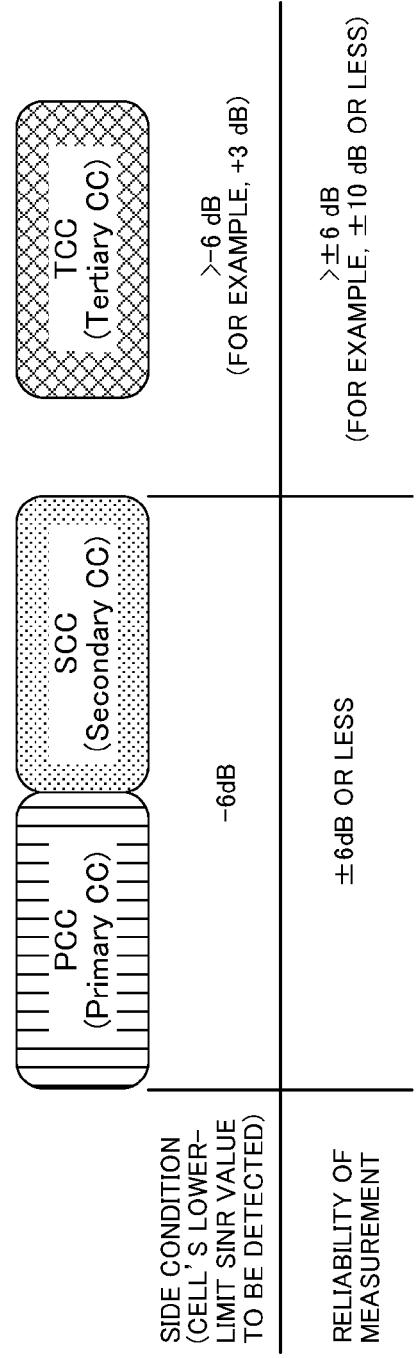

Assuming an existing system with a PCC and an SCC, the cells' lower-limit SINR value which a user terminal should detect is stipulated to be −6 dB, and the reliability (accuracy) of measurements is ±6 dB or less (within ±6 dB) (see FIG. 6B). So, with the present embodiment, the lower-limit SINR value which a user terminal should detect for a TCC can be configured greater than −6 dB (for example, +3 dB). Alternatively, the reliability of measurements can be configured greater than ±6 dB (for example, ±10 dB or less).

By this means, the user terminal can be structured to perform measurement operations for a TCC only when its quality is better than in an SCC and/or others, so that the user terminal's load can be reduced. Alternatively, since the level of reliability that is required to send out reports can be achieved with a smaller number of samples, it is possible to reduce the delays of reports even when, as mentioned earlier, the cycle of measurements is made longer. Note that the user terminal may be configured to measure TCCs by applying the same conditions as those for SCCs, and report the measurement results of only those TCCs that fulfill limited conditions (for example, only those TCCs where the lower-limit SINR value is greater than −6 dB (for example, +3 dB) are subject to reporting).

As mentioned earlier, a case may occur where an unlicensed band is configured as a TCC. Consequently, assuming that measurement signals (discovery signals and/or others) may not be transmitted periodically depending on the result of DL LBT on the radio base station end, a user terminal may be structured to perform measurement operations based on different predetermined conditions from those of PCCs and/or SCCs.

For example, a user terminal can be structured to make measurements in a TCC at predetermined timings based on commands from a licensed carrier (licensed CC). In this case, the radio base station can transmit downlink control information (DCI) to the user terminal by using the licensed band (which is, for example, the PCC or an SCC), and report the measurement timings for the TCC. By this means, it is possible to reduce unnecessary measurement operations (or reporting operation) in the user terminal with respect to the TCC, and, furthermore, know the timings of TCC measurements by the user terminal on the radio base station end.

Alternatively, a user terminal may perform measurement operations (blind detection) by predicting the results of LBT in a TCC. For example, a user terminal may be structured to make measurements/send reports with respect to a TCC when a measurement signal is detected from the TCC with power (for example, received power) that is equal to or greater than a predetermined value. By this means, the user terminal is spared from making unnecessary measurement operations (or reporting operation) with respect to the TCC.

Also, it is possible to structure a transmission point (radio base station) that employs LBT to transmit a reference signal before transmitting a DL signal when the result of LBT shows that the channel is in the idle state (LBT_idle) and transmission is judged to be possible. In this case, the user terminal can decide to transmit the DL signal in a licensed band based on the reference signal (for example, the beacon reference signal (BRS)). Consequently, the user terminal may control the measurement operations in a TCC based on beacon reference signals that are received (for example, perform measurement operations based on BRSs that are received, etc.).

Alternatively, a user terminal may be structured to perform measurement operations only with respect to a predetermined TCC (a predetermined TCC cell). Information about the predetermined TCC may be reported in advance from the radio base station to the user terminal, or the user terminal may make decisions autonomously.

For example, a user terminal may be structured to perform measurement operations only for TCCs (TCells) that are controlled under the connecting radio base station, and not measure TCCs under other radio base station (that is, limit the TCCs to make the target for measurements). Alternatively, a structure may be employed here in which the radio base station reports information about TCCs to be subject to measurements in the user terminal via the PCC and/or an SCC in advance, and the user terminal performs measurement and/or reporting operations only with respect to the reported TCCs.

In this way, by allowing a user terminal to limit the TCCs to make measurements for, it is possible to reduce the increase of load in the user terminal.

<Activated State>

When a TCC that is configured is in the activated state, a user terminal can apply different receiving operations and/or measurement operations from those for PCCs and/or SCCs, to the TCC (activated TCC).

In an existing system, a user terminal performs measurement operations (RRM measurements, CSI measurements, etc.) using downlink reference signals such as cell-specific reference signals (CRSs), channel state measurement reference signal (CSI-RSs: Channel State Information-Reference Signals) and so on, with respect to SCCs in the activated state. Also, the user terminal receives downlink control information (DCI) from the SCCs in the activated state via downlink control channels.

Although, according to the present embodiment, a user terminal performs DL signal receiving operations and measurement operations with respect to TCCs in the activated state as well, it is possible to apply receiving operations and/or measurement operations from those for SCCs.

For example, a user terminal can operate without the assumption that, in TCC, reference signals such as CRSs and others are transmitted in all subframes. In this case, the user terminal can apply receiving operations and/or measurement operations assuming that reference signals such as CRSs and others are transmitted at predetermined timings.

To be more specific, a user terminal can be structured to perform receiving operations for DL signals in a TCC (for example, the CRS, the CSI-RS, downlink control information, etc.) in predetermined timings based on commands from a licensed carrier (licensed CC). The radio base station can transmit downlink control information (DCI) to the user terminal by using the licensed band (for example, the PCC or an SCC), and report the timings to receive DL signals in the TCC. By this means, it is possible to reduce unnecessary receiving operations for the TCC in the user terminal, and, furthermore, know the receiving timings of the user terminal in the TCC on the radio base station end.

Alternatively, a user terminal may perform measurement operations (blind detection) by predicting the results of LBT in a TCC and so on. For example, a user terminal may be structured to perform receiving, measurement and/or reporting operations with respect to a TCC when a reference signal such as the CRS or a downlink control signal (PDCCH) is received from the TCC with power (for example, received power) that is equal to or greater than a predetermined value. By this means, it is possible to reduce unnecessary receiving operations and measurement operations (or reporting operations) in the user terminal with respect to the TCC.

Also, a transmission point (radio base station) to employ LBT may be structured to transmit a reference signal (BRS) before transmitting a DL signal when the result of LBT shows that the channel is in the idle state (LBT_idle) and transmission is judged to be possible. In this case, the user terminal can control the receiving operations and/or measurement operations in a TCC based on beacon reference signals that are received.

Also, the present embodiment can use a different method to control the activated state/deactivated state of a TCC to configure in a user terminal, from that used in existing SCCs.

In existing SCCs, a radio base station controls an SCC's configuration state (activated state/deactivated state) based on the measurement results of the SCC, reported from user terminals. By contrast, the present embodiment can control a TCC's configuration state based on a predetermined SCC.

For example, when TCCs are configured in a user terminal, it is possible to configure the TCCs in association with predetermined SCCs, and control each TCC's configuration state based on the state of the corresponding SCC (activated state/deactivated state).

In this case, when configuring a TCC in the user terminal, the radio base station can report information about the SCC that corresponds to that TCC, to the user terminal. The user terminal can operate, assuming that the SCC's reported configuration state and the corresponding TCC's configuration state are the same. For example, when a predetermined SCC assumes the deactivated state (deactivated), the user terminal can judge that the TCC to correspond to this SCC is also in the deactivated state.

In this way, by controlling the configuration state of a TCC based on another cell (SCC), it is no longer necessary to report the TCCs' activated state/deactivated state to a user terminal separately. Also, the user terminal does not need to judge the configuration state of the TCC by using reports from the radio base station.

<Non-Configuration of Activated State/Deactivated State>

The present embodiment may be structured not to configure the activated state/deactivated state for a TCC. For example, a user terminal, in which a TCC is configured, can employ the measurement operations for TCCs, and, furthermore, perform receiving operations for DL data that is transmitted in the PDSCH based on commands from other CCs (the PCC and/or SCCs) and/or measurement operations that use CSI-RSs (see FIG. 7A).

As for the measurement operations for TCCs, the same RRM measurements as in the PCC and/or SCCs, or simpler RRM measurements can be used (see, for example, FIG. 6). For the commands from the PCC and/or SCCs, cross-carrier scheduling to use downlink control information (PDCCH/EPDCCH) can be used.

With cross-carrier scheduling, when CA is used, allocation of a downlink shared channel (PDSCH) and/or an uplink shared channel (PUSCH) of a given CC (for example, a TCC) is commanded by using a downlink control channel (PDCCH and/or EPDCCH) of another CC (for example, the PCC and/or an SCC) (see FIG. 7B).

In FIG. 7B, downlink control information (DCI #2) to command allocation of the PDSCH and/or PUSCH transmitted in CC #2 (for example, a TCC) is multiplexed over the PDCCH of another CC #1 (for example, the PCC or an SCC) and transmitted. In this case, to identify to which CC (CC #1 or CC #2) the PDSCH and/or the PUSCH commanded to be allocated by the downlink control information (DCI #2) that is multiplexed over the PDCCH of CC #1 belongs to, a DCI configuration, in which a carrier indicator field (CIF) is provided, can be used.

For TCC DCI for user terminals, for example, DL assignments to command receipt of the PDSCH and UL grants to command transmission of the PUSCH and/or reporting of CSI can be used.

By this means, in a TCC, a user terminal does not have to receive downlink control information (PDCCH) regularly, and therefore monitoring of DCI becomes can be made unnecessary. Also, by configuring a user terminal to perform channel state measurements (CSI measurements) based on commands from the PCC and/or SCCs (for example, UL grants), it is possible to make the regular CSI measurement operations in the user terminal unnecessary. As a result of this, even when a plurality of TCCs are configured in a user terminal, it is possible to reduce the increase of the user terminal's load.

Second Example

With a second example, user terminal capability information (UE capability), which is reported from a user terminal to a radio base station when a TCC is configured apart from the PCC and SCCs will be described.

Figure 8:
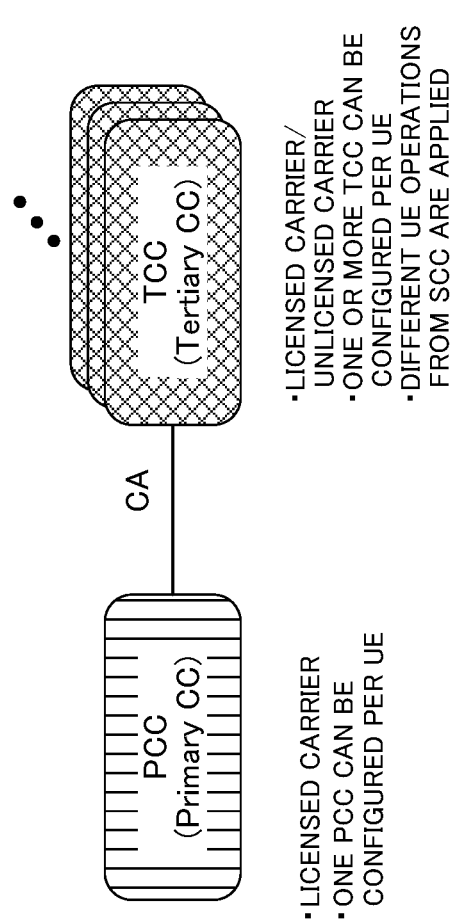
FIG. 8 is a diagram to show another example of carrier aggregation in which TCCs are used.

As mentioned earlier, when a TCC, to which a user terminal applies different operations from those of the PCC and SCCs, is introduced, the user terminal may execute CA using the PCC and the TCC (without configuring SCCs) (see FIG. 8). In this case, by making the measurement operations and/or receiving operations for the TCC simpler than for SCCs, it is possible to allow even a user terminal that does not support conventional CA to use a PCC and SCCs, to employ CA with a PCC and a TCC.

Consequently, to provide support for CA that uses TCCs, it is preferable to set forth new capability information (capability) for TCC CA. In this case, a user terminal can report the fact that the user terminal can support CA to use TCCs, and/or information about the TCCs that are available for use, to the radio base station.

To be more specific, the user terminal can report information about CCs that can be configured (or activated) as TCCs at the same time, to the radio base station. For example, the user terminal can report information to indicate the band that can be used in CA (carrier Aggregation bandwidth class), as when SCCs are used, and, in addition, report to the radio base station which CCs can be configured (or activated) as TCCs at the same time.

The TCC band is likely to be wide, and therefore it may be desirable to avoid configuring (or activating) all the TCCs at the same time. Consequently, in addition to reporting information (X_bandclass) that indicates bands that can used as TCCs, it is preferable to report to the radio base station which CCs can be configured (or activated) as TCCs. For example, the user terminal reports information about CCs that can be configured (or activated) at the same time, to the radio base station, by using bitmap. Alternatively, the user terminal may report information about the number of CCs that can be configured (or activated) at the same time, to the radio base station.

For example, the user terminal can report information about the combination of TCCs that can used for a given bandwidth (band) and the number of CCs that can be configured (the maximum number of CCs), to the radio base station. Also, in addition to information about TCCs that can be used, the user terminal can also report information about the duplex mode (FDD or TDD) that can be applied to each TCC to the radio base station as capability information. In particular, if duplex modes are not applied to TCCs on a fixed basis, it is effective if a user terminal reports which duplex modes can be applied to each TCC, to the radio base station, in advance.

Also, when unlicensed bands are introduced, cases might occur where every country's laws and regulations require different functions to use unlicensed bands. Consequently, a user terminal may report to the radio base station whether or not each country's laws and regulations provide support for unlicensed bands (TCCs). In this case, it is preferable if the user terminal reports information about its capability (capability) to comply with the laws and regulations governing each country, in addition information about TCCs that may be available for use. By this means, the radio base station can configure adequate TCCs in the user terminal.

(Structure of Radio Communication System)

Now, the structure of the radio communication system according to an embodiment of the present invention will be described below. In this radio communication system, the radio communication methods according to the embodiments of the present invention are employed. Note that the radio communication methods of the above-described embodiments may be applied individually or may be applied in combination.

Figure 9:
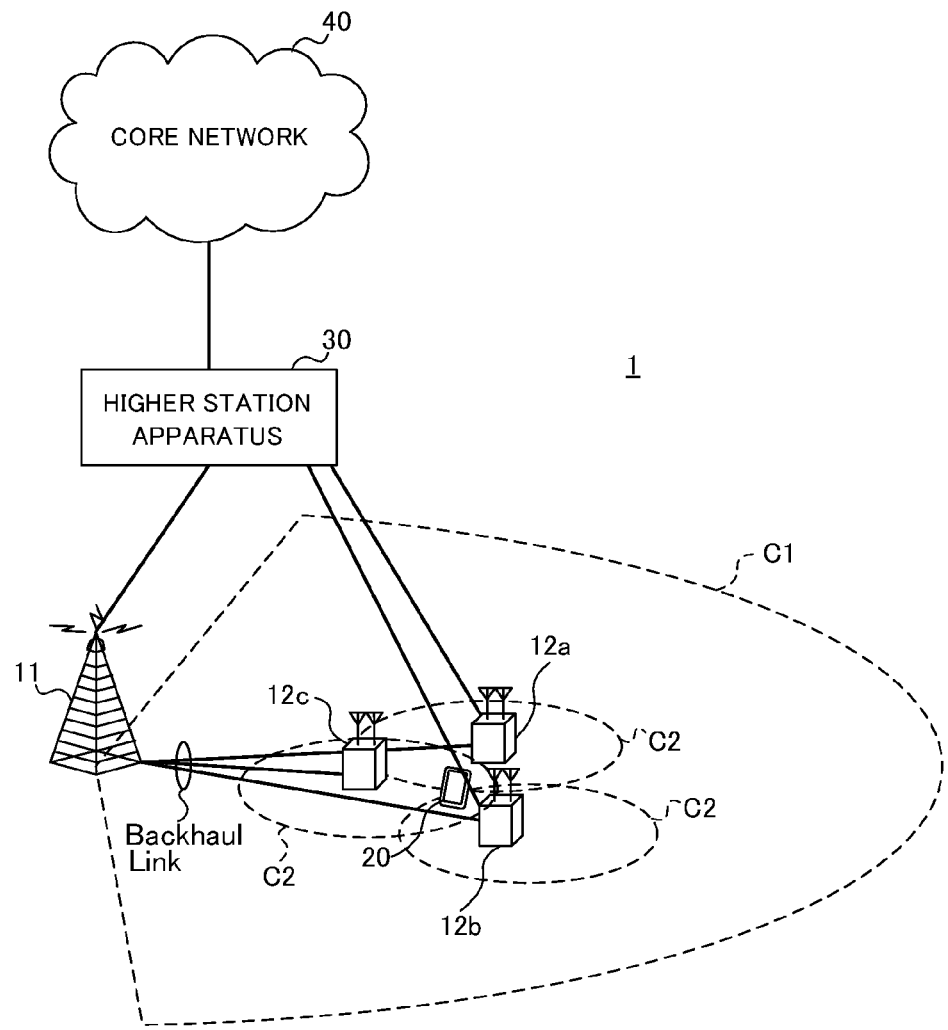
FIG. 9 is a diagram to show an example of a schematic structure of a radio communication system according to the present embodiment.

FIG. 9 is a diagram to show an example of a schematic structure of a radio communication system according to an embodiment of the present invention. Note that the radio communication system shown in FIG. 9 is a system to incorporate, for example, an LTE system, super 3G, an LTE-A system and so on. In this radio communication system, carrier aggregation (CA) and/or dual connectivity (DC) to bundle a plurality of component carriers (PCC, SCC, TCC, etc.) into one can be used. Note that this radio communication system may be referred to as "IMT-Advanced," or may be referred to as "4G," "5G," "FRA" (Future Radio Access) and so on.

The radio communication system 1 shown in FIG. 9 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using at least six or more CCs (cells). For example, it is possible to configure, in the user terminals, the macro cell C1 as the PCell (PCC) and the small cells C2 as SCells (SCCs) and/or TCells (TCCs). Also, for TCCs, licensed bands and/or unlicensed bands can be configured.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as a "radio base station 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRSs), channel state measurement reference signals (CSI-RSs: Channel State Information-Reference Signals), user-specific reference signals (DM-RSs: Demodulation Reference Signals) for use for demodulation and others are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 10:
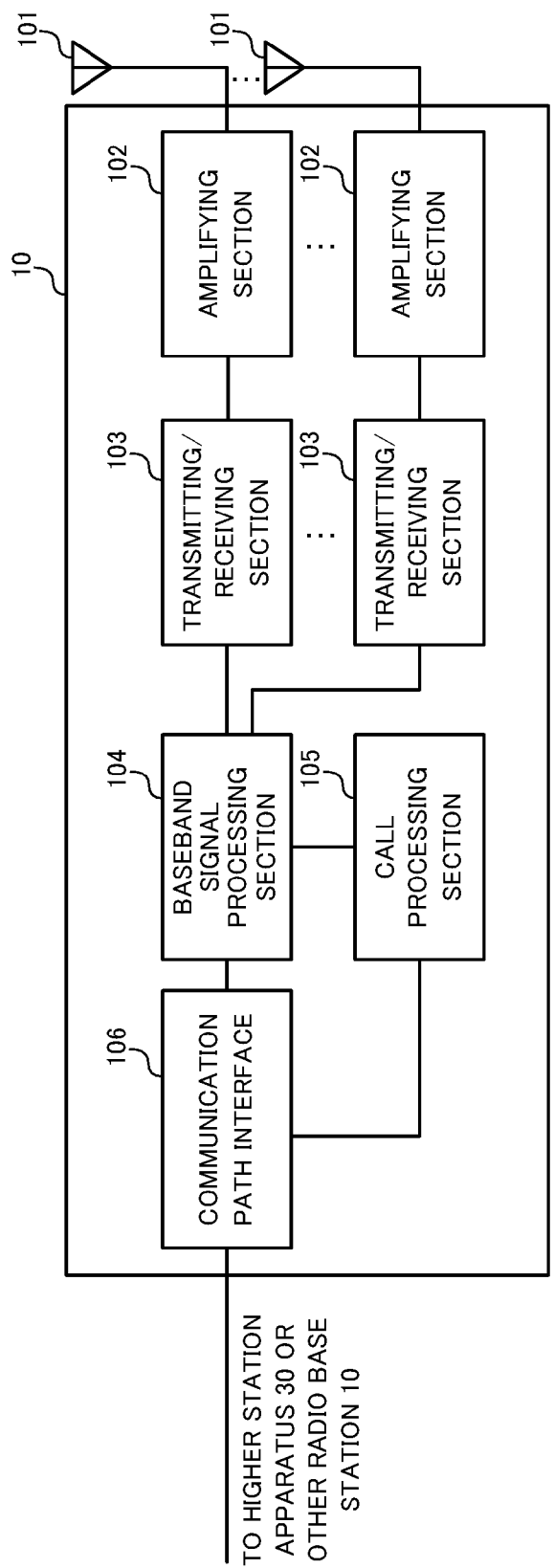
FIG. 10 is a diagram to show an example of an overall structure of a radio base station according to the present embodiment.

FIG. 10 is a diagram to show an example of an overall structure of a radio base station according to one embodiment of the present invention. A radio base station 10 has a plurality of transmitting/receiving antennas 10, amplifying sections 102, transmitting/receiving sections 103, a baseband signal processing section 104, a call processing section 105 and a communication path interface 106. Note that the transmitting/receiving sections 103 are comprised of transmission sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

For example, the transmitting/receiving sections 103 can transmit information about CCs that execute CA (for example, information about a CC to serve as a TCC, and so on). Also, the transmitting/receiving sections 103 can report receiving operation and/or measurement operation commands in TCCs via downlink control information (PDCCH) of the PCC and/or SCCs, to the user terminals. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 transmits and receives signals to and from neighboring radio base stations 10 (backhaul signaling) via an inter-base station interface (for example, optical fiber, the X2 interface, etc.).

Figure 11:
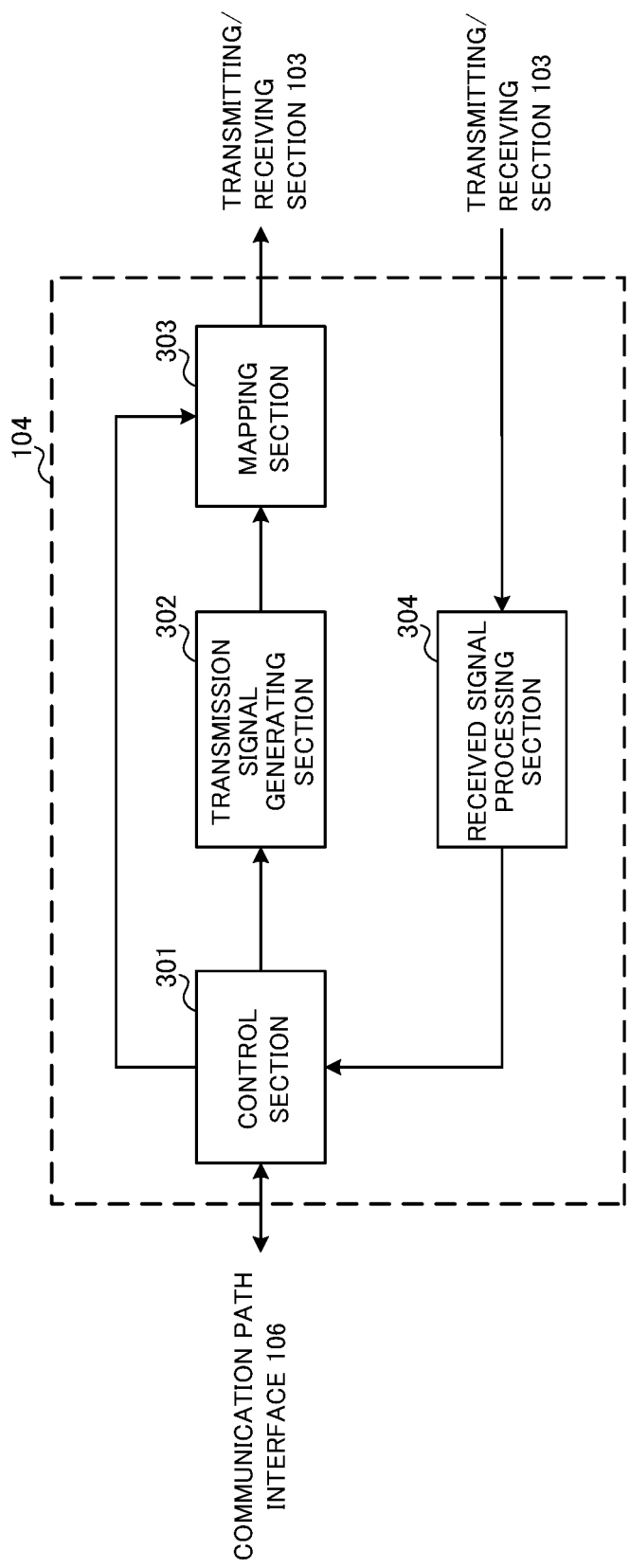
FIG. 11 is a diagram to show an example of a functional structure of a radio base station according to the present embodiment.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section (scheduler) 301, a transmission signal generating section (generating section) 302, a mapping section 303 and a received signal processing section 304.

The control section (scheduler) 301 controls the scheduling of (for example, allocates resources to) downlink data signals that are transmitted in the PDSCH and downlink control signals that are communicated in the PDCCH and/or the EPDCCH. Furthermore, the control section (scheduler) 301 also controls the scheduling of system information, synchronization signals, paging information, CRSs, CSI-RSs and so on.

For an unlicensed CC (for example, a TCC), the control section 301 controls the transmission of DL signals based on the result of DL LBT. When LBT is executed in the unlicensed band (TCC), the control section 301 may control the result of this LBT to be reported to the user terminal in a licensed band (the PCC and/or an SCC). Also, in the TCC, the control section 301 can configure the transmission cycle of downlink reference signals (for example, the CRS, the CSI-RS, etc.) longer than in SCCs, or configure the transmission cycle shorter than in SCCs.

Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on. Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminal (for example, delivery acknowledgement signals (HARQ-ACKs), data signals that are transmitted in the PUSCH, random access preambles that are transmitted in the PRACH, and so on). The processing results are output to the control section 301.

Also, by using the received signals, the received signal processing section 304 may measure the received power (for example, the RSRP (Reference Signal Received Power)), the received quality (for example, the RSRQ (Reference Signal Received Quality)), channel states and so on. Alternatively, the received signal processing section 304 may execute DL LBT before DL signals are transmitted. Note that the measurement results in the received signal processing section 304 may be output to the control section 301. Note that a measurement section to perform the measurement operations may be provided apart from the received signal processing section 304.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 12:
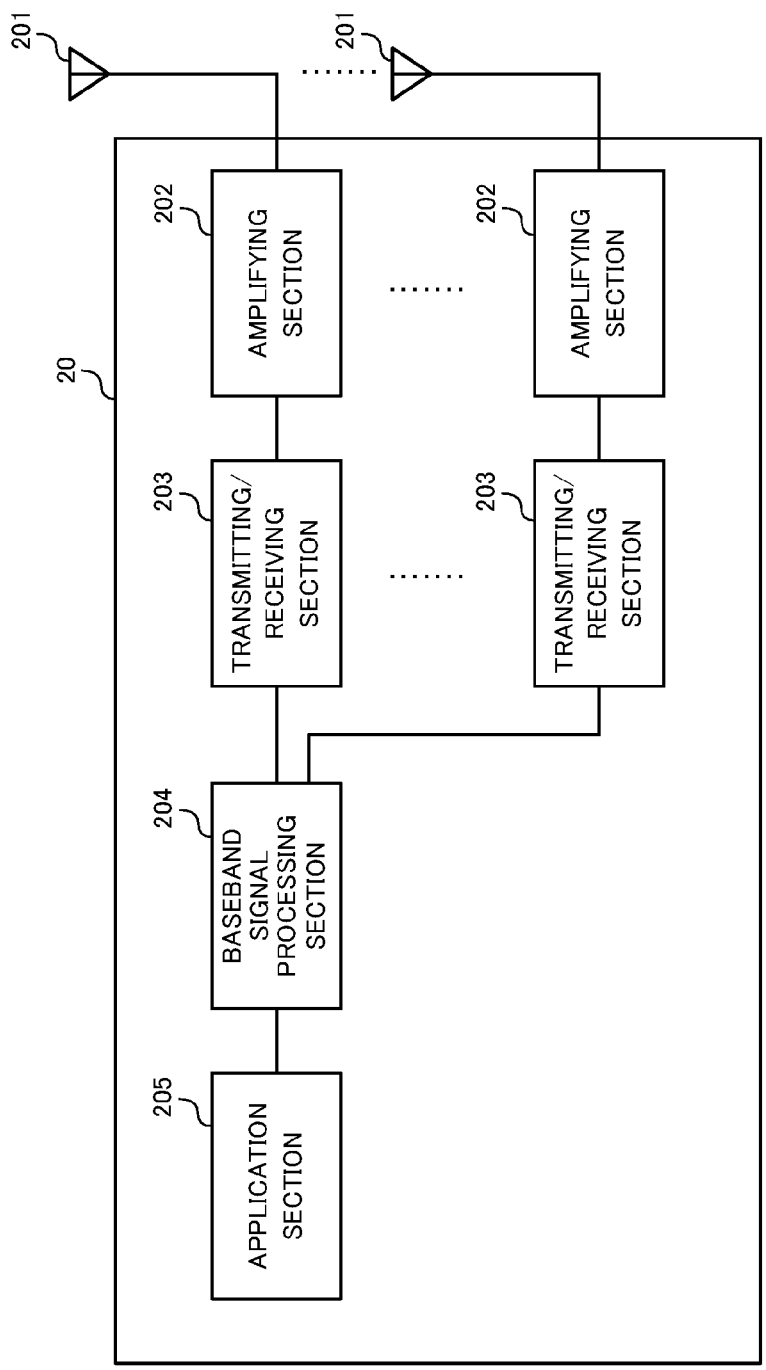
FIG. 12 is a diagram to show an example of an overall structure of a user terminal according to the present embodiment.

FIG. 12 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmission sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections 203 can report the user terminal's capability information (capability) to the radio base station. For example, the transmitting/receiving sections 203 transmits information about TCCs that can be used at the same time (for example, information about the combination of TCCs), in addition to information about the frequencies in which TCCs can be used, to the radio base station. Also, the transmitting/receiving sections 203 may transmit information about the duplex mode (FDD or TDD) that is applicable to each third CC that can be configured. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 13:
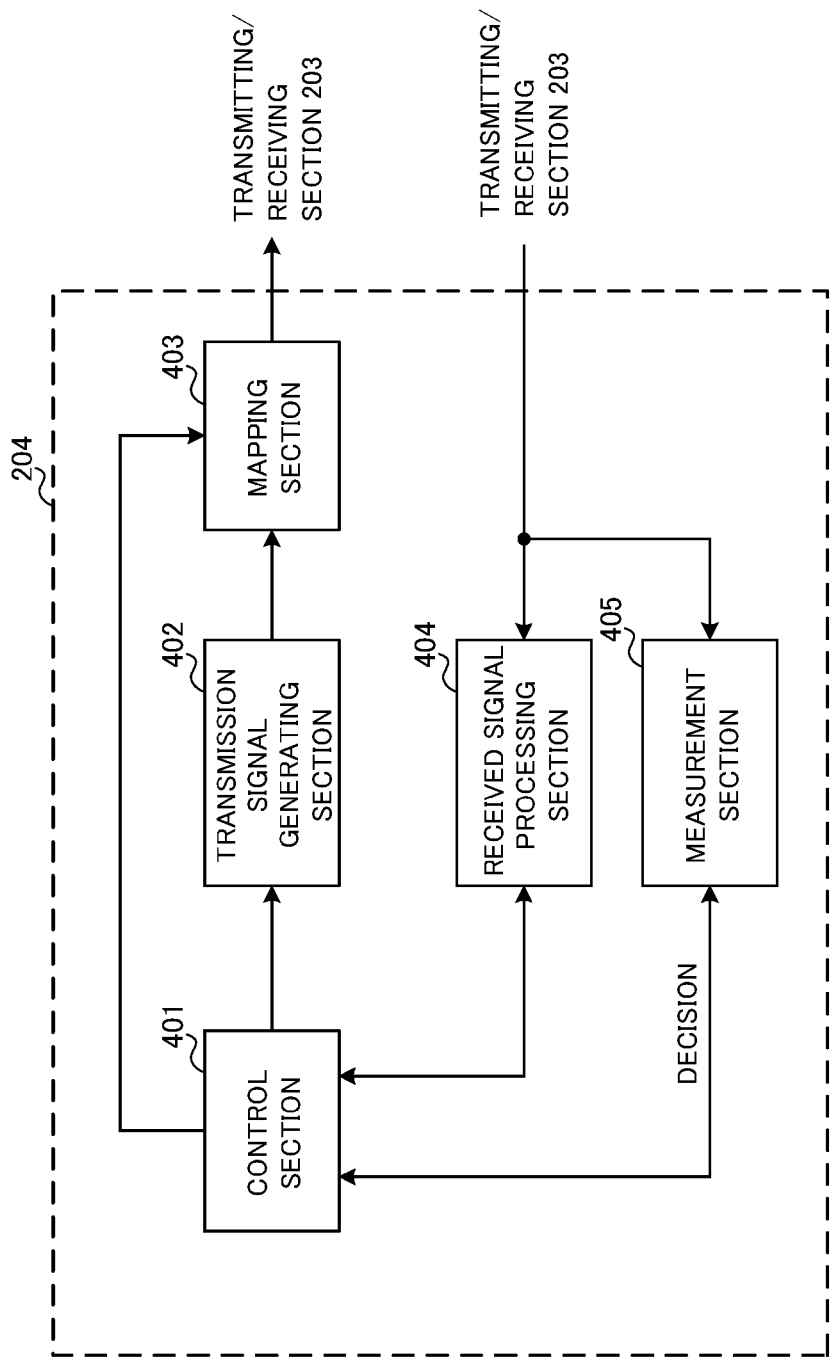
FIG. 13 is a diagram to show an example of a functional structure of a user terminal according to the present embodiment.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generating section 402, a mapping section 403, a received signal processing section 404 and a measurement section 405.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals) and uplink data signals based on the downlink control signals, the results of deciding whether or not retransmission control is necessary for the downlink data signals, and so on.

The control section 401 can control the transmission signal generating section 402, the mapping section 403, the received signal processing section 404 and the measurement section 405. For example, when the user terminal employs CA that uses TCCs (see FIG. 5 and FIG. 8), the control section 401 applies control so that receiving operations and/or measurement operations that are different from those of the PCC and/or SCCs are applied to the TCCs.

For example, the control section 401 can configure the measurement period in the TCCs shorter than the measurement cycle in SCCs (see FIG. 6A), and/or configure the measurement cycle in the TCCs longer than the measurement cycle in SCCs. Alternatively, the control section 401 can configure the lower limit value of the SINR (Signal to Interference plus Noise power Ratio) of DL signals that is to be detected upon measurements for the TCCs higher than the lower-limit SINR value of DL signals to be detected in measurements for SCCs (see FIG. 6B).

The control section 401 can control the measurement section 405 to make measurements for a TCC when a command is received from the PCC and/or SCCs or when received power that is equal to or greater than a predetermined value is detected from the TCC. Alternatively, the control section 401 may control the measurement section 405 to limit the TCCs to subject to measurements to the TCCs under the radio base station to which the user terminal is connected.

The control section 401 may decide the state of a TCC that is configured (the activated state or the deactivated state) based on the state of the PCC or an SCC that is associated in advance with this TCC, and control the receiving operations and/or measurement operations accordingly.

Also, the control section 401 can control the data signal receiving operations and/or measurement operations that use channel state measurement reference signals for TCCs based on cross-carrier scheduling from the PCC and/or SCCs (see FIG. 7).

For the control section 401, a controller, a control circuit or a control device that can be described based on common understanding of the technical field to which the present invention pertains can be used.

The transmission signal generating section 402 generates UL signals based on commands from the control section 401 and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. Also, the transmission signal generating section 402 generates UL signals from the results of measurements in the measurement section 405, based on commands from the control section 401. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving processes (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401. The received signal processing section 404 outputs, for example, broadcast information, system information, RRC signaling, DCI and so on, to the control section 401.

The received signal processing section 404 can control the DL signal receiving operations based on commands from the control section 401. For example, when a TCC is configured in the user terminal, the received signal processing section 404 can perform receiving operations that are different from those of the PCC and/or SCCs, based on commands from the control section 401 (see FIG. 7). Note that, for the received signal processing section 404, a signal processor/measurer, a signal processing/measurement circuit or a signal processing/measurement device that can be described based on common understanding of the technical field to which the present invention pertains can be used. Also, the received signal processing section 404 can constitute the receiving section according to the present invention.

The measurement section 405 makes measurements (for example, RRM measurements, CSI measurements, etc.) by using the DL signals that are received (for example, the CRS, the CSI-RS, etc.). To be more specific, the measurement section 405 can measure the received power (for example, the RSRP (Reference Signal Received Power)), the received quality (RSRQ (Reference Signal Received Quality)), channel states and so on by using the DL reference signals that are received (for example, the CRS, the CSI-RS, etc.). The processing results are output to the control section 401.

The measurement section 405 can control the DL signal measurement operations based on commands from the control section 401. For example, when a TCC is configured in the user terminal, the measurement section 405 can perform different measurement operations from those for the PCC and/or SCCs, based on commands from the control section 401 (see FIG. 6 and FIG. 7). For the received signal processing section 404, a signal processor/measurer, a signal processing/measurement circuit or a signal processing/measurement device that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-030784, filed on Feb. 19, 2015, including the specification, drawings and abstract, is incorporated herein by reference in its entirety.

The invention claimed is:

1. A user terminal communicating with a radio base station by carrier aggregation using a plurality of component carriers (CC), the user terminal comprising:
   a receiver that receives a downlink (DL) signal transmitted from each of the CCs; and
   a processor that measures the DL signal based on a measurement requirement,
   wherein a first measurement requirement of a first secondary CC to which listening before transmission is applied is different from a second measurement requirement of a second secondary CC to which the listening before transmission is not applied, and
   a lower limit value of Signal to Interference plus Noise power Ratio (SINR) of a DL signal to detect in measurement of the first secondary CC is higher than a lower limit value of SINR of a DL signal to detect in measurement of the second secondary CC.

2. The user terminal according to claim 1, wherein the first measurement requirement of the first secondary CC in an activated state is different from the second measurement requirement of the second secondary CC in the activated state.

3. The user terminal according to claim 1, wherein the first measurement requirement of the first secondary CC in a deactivated state is different from the second measurement requirement of the second secondary CC in the deactivated state.

4. The user terminal according to claim 1, wherein the processor controls reception of the first secondary CC based on cross-carrier scheduling.

5. The user terminal according to claim 1, further comprising a transmitter that transmits, to the radio base station, capability information for carrier aggregation using a secondary cell to which listening before transmission is applied.

6. A radio base station communicating with a user terminal by carrier aggregation using a plurality of component carriers (CCs), the radio base station comprising:
   a transmitter that transmits a downlink (DL) signal in each of the CCs; and
   a processor that controls transmission of the DL signal,
   wherein a first measurement requirement of a first secondary CC to which listening before transmission is applied is different from a second measurement requirement of a second secondary CC to which the listening before transmission is not applied, and the processor configures the user terminal with measurement of the DL signal based on a measurement requirement, and a lower limit value of Signal to Interference plus Noise power Ratio (SINR) of a DL signal to detect in measurement of the first secondary CC is higher than a lower limit value of SINR of a DL signal to detect in measurement of the second secondary CC.

7. A radio communication method for a user terminal communicating with a radio base station of carrier aggregation using a plurality of component carriers (CC), the radio communication method comprising:

receiving a downlink (DL) signal transmitted from each of the CCs; and measuring the DL signal based on a measurement requirement, wherein a first measurement requirement of a first secondary CC to which listening before transmission is applied is different from a second measurement requirement of a second secondary CC to which the listening before transmission is not applied, and a lower limit value of Signal to Interference plus Noise power Ratio (SINR) of a DL signal to detect in measurement of the first secondary CC is higher than a lower limit value of SINR of a DL signal to detect in measurement of the second secondary CC.

* * * * *